(12) United States Patent
Shibayama

(10) Patent No.: US 7,260,243 B2
(45) Date of Patent: Aug. 21, 2007

(54) INTRUDING-OBJECT DETECTION APPARATUS

(75) Inventor: Norifumi Shibayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 908 days.

(21) Appl. No.: 10/648,315

(22) Filed: Aug. 27, 2003

(65) Prior Publication Data

US 2004/0041905 A1 Mar. 4, 2004

(30) Foreign Application Priority Data

Aug. 30, 2002 (JP) ............................ 2002-255417

(51) Int. Cl.
*G06K 9/00* (2006.01)
*H04N 7/18* (2006.01)

(52) U.S. Cl. .................. 382/103; 382/154; 348/153
(58) Field of Classification Search ............... None
See application file for complete search history.

(56) References Cited

U.S. PATENT DOCUMENTS 5,719,954 A * 2/1998 Onda ..................... 382/154
6,985,619 B1 * 1/2006 Seta et al. ............... 382/154

FOREIGN PATENT DOCUMENTS

| EP | 0 686 942 A2 | 12/1995 |
| EP | 1 128 676 A2 | 8/2001 |
| EP | 1128676 A3 | 8/2001 |
| JP | 04031996 A * | 2/1992 |
| JP | 5-16811 | 1/1993 |
| JP | 8-317373 | 11/1996 |
| JP | 9-282569 | 10/1997 |
| JP | 2000261787 A * | 9/2000 |

OTHER PUBLICATIONS

European Search Report dated Jun. 15, 2004.

* cited by examiner

*Primary Examiner*—Bhavesh M Mehta
*Assistant Examiner*—Charles Kim
(74) *Attorney, Agent, or Firm*—McGinn IP Law Group, PLLC

(57) ABSTRACT

Just after starting, right and left images, each of which includes a fixed object and does not include an intruding object, are read as background images. Background parallaxes are obtained from the background images. Subsequently, when an intruding object exists in the background images, motion pictures of the intruding object which is moving are read. The brightness of an arbitrary pixel in the right image is compared to the brightness of a pixel, deviated from the pixel by the background parallax, in the left image. As the result of the comparison, the image corresponding to the intruding object is cut from the right image. Consequently, the influences of a three-dimensional object existing in the background and an environmental condition are eliminated. The intruding object can be detected with high accuracy and high reliability.

9 Claims, 4 Drawing Sheets

INTRUDING-OBJECT DETECTION APPARATUS

The disclosure of Japanese Patent Application No. 2002-255417 filed on Aug. 30, 2002 including the specification, drawings and abstract is incorporated herein by reference in its entirety.

BACKGROUND OF THE INVENTION

1. Field of the Invention

The present invention relates to an intruding-object detection apparatus for detecting an object intruding into a field of view using a stereo camera.

2. Description of the Related Art

The applications of image recognition techniques include an intruding-object detection apparatus for detecting an object intruding into the field of view of a camera. For example, Japanese Unexamined Patent Application Publication No. 5-16811 discloses a system for detecting an obstacle which intrudes into a railroad crossing on the basis of images taken by cameras. According to this related art, background images taken by two cameras are aligned. After that, whether an object exists in the railroad crossing is determined by a correlation process based on one-dimensional Fourie transformation. In addition, Japanese Unexamined Patent Application Publication No. 8-317373 discloses a technique of detecting an object intruding into a field of view using variations in illumination of monochrome images taken by a single camera. Japanese Unexamined Patent Application Publication No. 9-282569 discloses a technique similar to the above.

According to the former related art, images are corrected in alignment using ground serving as a single plane as a reference. Accordingly, when fixed objects which lie on the ground but are not subjects to be detected, for example, a wall, a fence, weeds, and various devices existing in the vicinity of the railroad crossing are included in the field of view, these objects may be detected as intruding objects by mistake.

According to the latter related art whereby an intruding object is detected using variations in illumination of monochrome images, it is fundamentally difficult to completely eliminate false detection or a detection error with respect to an object on the basis of a fluctuation of environmental illumination.

SUMMARY OF THE INVENTION

Accordingly, it is an object of the present invention to provide an intruding-object detection apparatus which can eliminate the influences of a three-dimensional object existing in a background and an environmental condition and detect an intruding object with high accuracy and high reliability.

In brief, according to the intruding-object detection apparatus of the present invention, a matching point for the same subject between a reference image and a comparison image is obtained and stored, the reference image and the comparison image being taken by a stereo camera. The difference between image information near an arbitrary position in the reference image and image information near a position, deviated from the arbitrary position by the stored matching point, in the comparison image is evaluated. An area where the difference is large, is output as an area indicating an intruding object.

Other features and advantages of the present invention will be clarified more fully from the following detailed description.

DETAILED DESCRIPTION OF THE PREFERRED EMBODIMENTS

Figure 1:
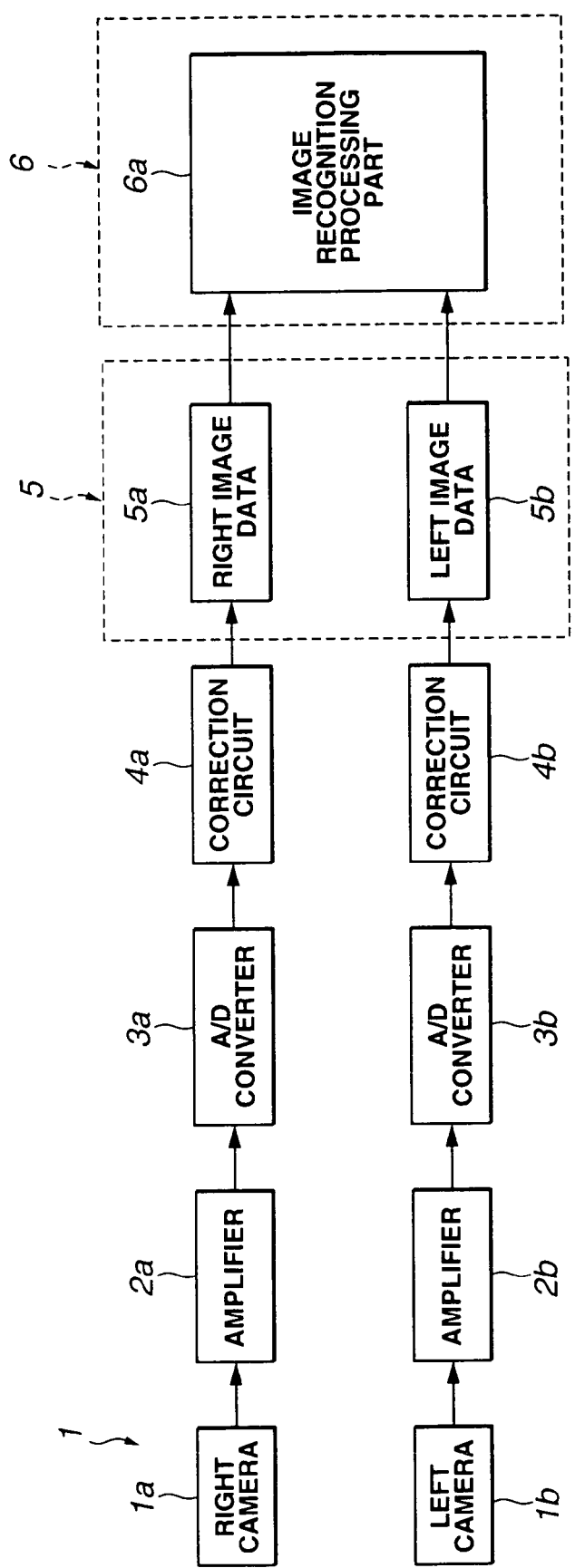
FIG. 1 is a block diagram of the structure of an intruding-object detection apparatus according to a first embodiment of the present invention.

A first embodiment of the present invention will now be described with reference to FIGS. 1 to 5. FIG. 1 shows an intruding-object detection apparatus for detecting an object (intruder) intruding into the field of view of a camera. To photograph a monitor target area, this apparatus uses a stereo camera 1 composed of a pair of cameras 1a and 1b which are synchronized with each other. The intruding-object detection apparatus comprises the cameras 1a and 1b constituting the stereo camera 1, amplifiers 2a and 2b, analog-to-digital (A/D) converters 3a and 3b, correction circuits 4a and 4b, an image data memory 5 which comprises of image data memories 5a and 5b, and an image processing device 6. The components 2a, 3a, 4a, and 5a correspond to the camera 1a and the components 2b, 3b, 4b, and 5b correspond to the camera 1b. The amplifiers 2a and 2b proportionately amplify image signals supplied from the cameras 1a and 1b, respectively. The A/D converters 3a and 3b convert analog image signals, proportionately amplified through the amplifiers 2a and 2b, into digital image signals with a predetermined brightness gradation (for example, 256-level gray scale), respectively. The correction circuits 4a and 4b correct the gains peculiar to the amplifiers 2a and 2b, respectively. The image data memories 5a and 5b store digital images processed through the correction circuits 4a and 4b, respectively. The image processing device 6 performs various image processing and image recognition using the images stored in the image data memories 5a and 5b to detect an intruding object.

According to the first embodiment, each of the two cameras 1a and 1b, constituting the stereo camera 1, includes an imaging device such as a charge coupled device (CCD). The cameras 1a and 1b are color or monochrome cameras. The cameras 1a and 1b are arranged with a predetermined base line length therebetween so that the optical axes (axes perpendicular to imaging planes) are parallel to each other. In the following description, it is assumed that the cameras 1a and 1b are disposed laterally on the right and left, the camera 1a is set to a right camera for taking a picture serving as a reference image used for a stereo matching process, the other camera 1b is set to a left camera for taking a picture serving as a comparison image used for the stereo matching process, the reference image is set to a right image, and the comparison image is set to a left image. The cameras 1a and 1b can be arranged longitudinally or diagonally.

The image processing device 6 comprises a microcomputer as a main component. The image processing device 6 includes an image recognition processing unit 6a for performing image recognition which is realized by software processing. In the image recognition processing unit 6a, the right and left images, captured by the stereo camera 1, are subjected to the stereo matching process, thus obtaining a matching point between the right and left images. On the basis of the difference between image information near the matching point of the right image and that of the left image, an intruding object is detected.

An intruding-object detection process executed in the image processing device 6 will now be described with reference to a flowchart of FIG. 2.

Figure 2:
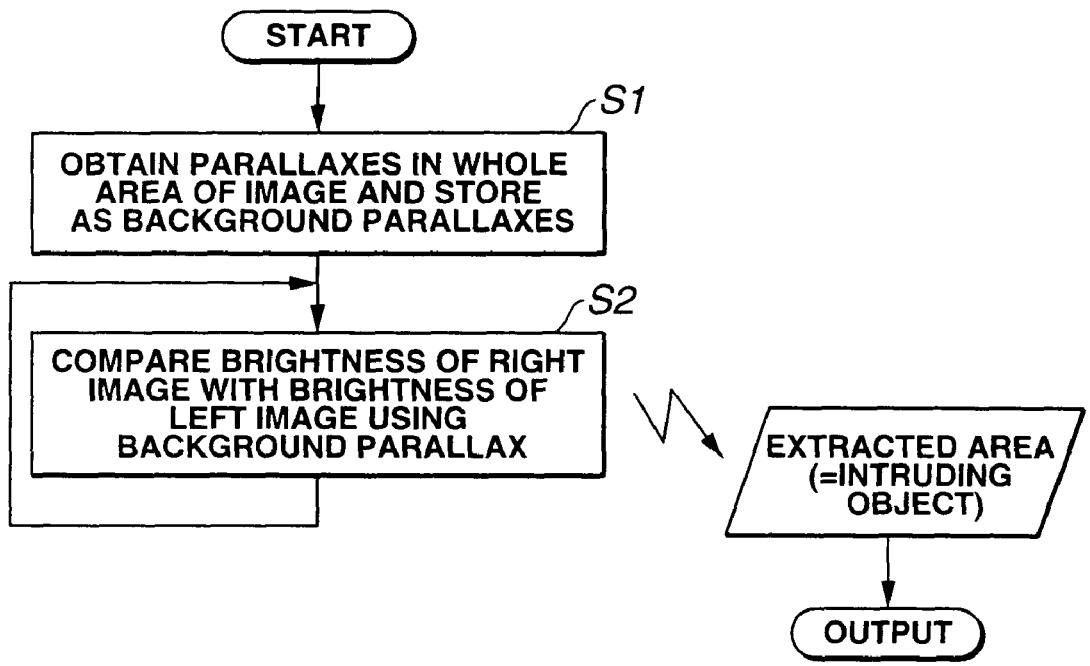
FIG. 2 is a flowchart of an intruding-object detection process according to the first embodiment.

The intruding-object detection process shown in FIG. 2 is started in a state in which an intruding object does not exist in the field of view of the stereo camera. In other words, in step S1 just after the start, a matching point between the right and left images is obtained from right and left background images which do not include an intruding object. In step S2, the intruding-object detection process is performed to motion pictures which may include an intruding object every frame on the basis of the matching point.

In detail, in step S1, right and left images including no intruding object are read out from the image data memory 5. A matching point between the right and left images is obtained on the basis of the correlation between the two images by the well-known stereo matching process. According to the present embodiment, for the matching point between the right and left images, a parallax is obtained for every position in the right image by one-dimensional search along the epipolar line in the right and left images.

In this instance, the "parallax" indicates the amount d of pixel deviation (hereinbelow, referred to as the pixel deviation amount d) in the horizontal direction. The pixel deviation amount d in the horizontal direction is defined when an object projected on a pixel at a horizontal coordinate x and a vertical coordinate y, namely, at coordinates (x, y) in an image plane of the right image is determined as an object projected on a pixel at (x+d, y) in an image plane of the left image by stereo matching. The pixel deviation amount d has different values with respect to the x coordinate position and the y coordinate position. Therefore, a parallax at coordinates (x, y) is expressed by d[x, y].

A process of obtaining parallaxes in the whole right image is performed. Obtained parallax values d[x, y] are stored in the memory. The array of parallaxes d[x, y] stored in the memory is called "background parallaxes". For example, when the size of the right image is 512×200 pixels, the background parallaxes include data of 512×200.

According to the present embodiment, in order to reduce the number of cases where the left image has no matching point corresponding to a pixel in the right image, the angle of view of the left camera 1b is set to be larger than that of the right camera 1a. According to the present embodiment, a parallax in the left image with respect to the right image is obtained. A parallax in the right image with respect to the left image can also be obtained. In the case where the cameras 1a and 1b are arranged longitudinally or diagonally, one-dimensional search is performed along the epipolar line in the vertical or diagonal direction, thus obtaining a matching point between the reference image and the comparison image.

In this case, the calculation of the background parallax can be performed every pixel as mentioned above. In the case of an apparatus having a relatively small memory capacity, calculation is preferably performed every predetermined block. Accordingly, the amount of data can be reduced, resulting in a reduction in the memory capacity. For example, the whole image is divided into small areas each comprising 4×4 pixels, only one parallax is calculated every small area, and the parallaxes of the respective small areas are stored as background parallaxes in the memory. The parallax for each small area can be obtained by, for instance, calculating the city block distance between the small areas of the right and left images. A parallax is the positional deviation between the small areas of the right and left images when the city block distance is minimized. Consequently, as compared to the case where the background parallax is stored every pixel, the amount of data to be stored can be reduced (in the case of storing a background parallax every small area of 4×4 pixels, the amount of data to be stored is ¹⁄₁₆). Thus, the required memory capacity can be reduced.

Figure 3:
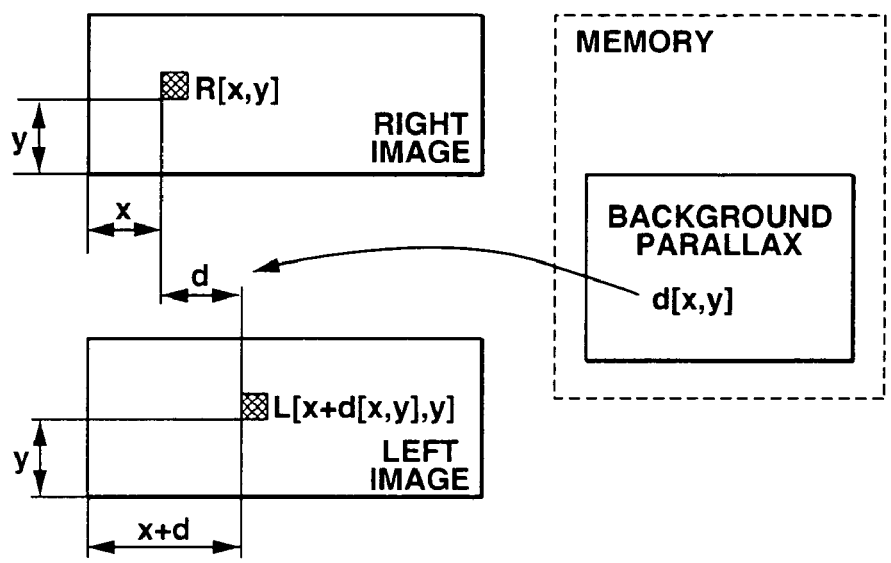
FIG. 3 is an explanatory diagram showing the comparison between the brightness of a matching point in a right image and that in a left image.

After the background parallaxes are obtained, in step S2, the process is executed every period of motion pictures. In step S2, the difference between image information near the matching point of the right image and that of the left image is evaluated, the matching point being obtained in step S1. Coordinates at which the difference is large are output as coordinates indicating an intruding object. Specifically speaking, right and left images of the current frame are read out from the image data memory 5. As shown in FIG. 3, the brightness of a pixel R[x, y] at coordinates (x, y) in the right image is compared to the brightness of a pixel L[x+d[x, y], y] in the left image, thus rematching the right and left images. In the left image, the pixel L[x +d[x, y], y] is deviated from the pixel R[x, y] by the background parallax d. In the rematching of the right and left images, when the absolute value of the difference between the brightness of the pixel R[x, y] and that of the pixel L[x+d[x, y], y] is larger than a predetermined threshold value, the relevant pixel is extracted from the right image. In this manner, the rematching is performed to all pixels corresponding to whole coordinates (x, y) in the right image to extract the relevant pixels. A set of the coordinates of the extracted pixels is output as a detection result regarding the intruding object every frame.

Figure 4:
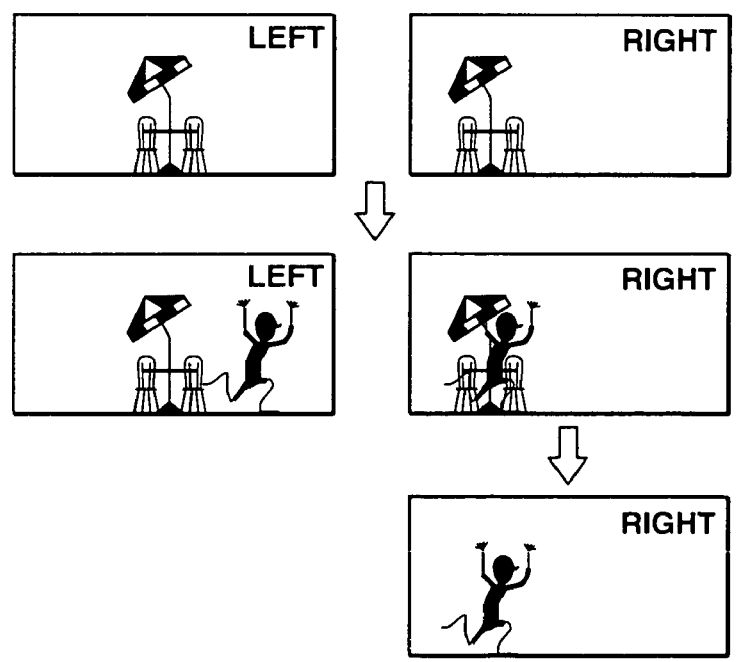
FIG. 4 is views explaining cutting of an image corresponding to an intruding object.

In other words, just after the start, in step S1, right and left images are read as background images. Each of the right and left images includes only a fixed object (table) and does not include an intruding object as shown in FIG. 4. Background parallaxes are obtained from the background images. Subsequently, if an intruding object exists in the background images, motion pictures of the intruding object (person) as shown in FIG. 4 are read in step S2. The brightness of a pixel in the right image is compared to the brightness of a pixel, deviated from the pixel by the background parallax, in the left image. As the result of the comparison, the image of the intruding object (person) in front of the fixed object (table) is cut from the right image. Thus, the presence of the intruding object and the position and shape thereof can be detected. When there is no intruding object, the above-mentioned "set of the coordinates of pixels" is output as an empty set. Thus, the absence of the intruding object can be detected.

Figure 5:
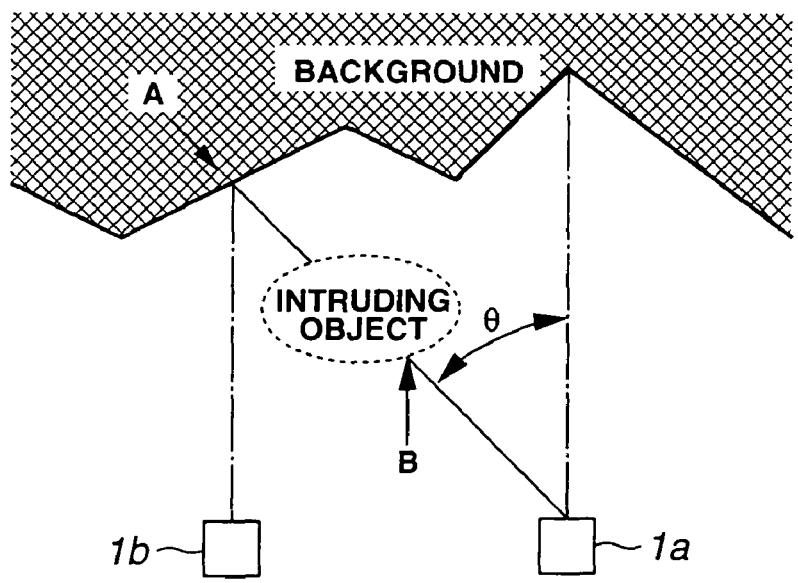
FIG. 5 is a diagram explaining the detection of the intruding object.

FIG. 5 schematically shows the above-mentioned detection of the intruding object. When there is no intruding object in the background images, a point in the right image and a point, deviated from the point by the background parallax, in the left image correspond to the same position (a point A at an angle θ corresponding to the background parallax in the right image) in a real space. There is no difference between the brightness of the right image and that of the left image and any intruding object is not extracted. On the other hand, when an intruding object exists, a point in the right image and a point, deviated from the point by the background parallax, in the left image correspond to different objects (a point B corresponding to the intruding object in the right image and a point A in the left image) in the real space. Except when respective objects in the right and left images coincidentally have similar brightnesses, there is the difference between the brightnesses (brightness difference). An area having pixels whose absolute value of the brightness difference is larger than the threshold value is extracted as an area corresponding to the intruding object. Referring to FIG. 5, the point A corresponds to the table in FIG. 4 and the point B corresponds to the person in FIG. 4.

In the above process, when the right and left images are color images, the brightness of each of the three primary colors R (red), G (green), and B (blue) of the pixel R[x, y] at coordinates (x, y) in the right image is compared to that of the pixel L[x+d[x, y], y] horizontally deviated by the background parallax d in the left image. Pixels whose sum of the absolute values of the brightness differences of R, G, and B is larger than a predetermined threshold value are extracted as an area indicating an intruding object from the right image. The background parallaxes are obtained in a manner similar to the above. Since a color image has the amount of information larger than that of a monochrome image, the reliability of pixel extraction is increased. Thus, the detection accuracy of the intruding object can be further increased.

Rematching the right and left images can be performed not only every pixel but also every block. In other words, a block having a certain size, for example, a small area of 4×4 pixels is extracted from the right image. Further, the origin (pixel on the left corner) at coordinates (x, y) of the small area in the right image is deviated by the background parallax to obtain a pixel [x+d[x, y], y] in the left image. The pixel is set to the origin in the left image and a small area of 4×4 pixels is cut from the left image. The parallax d[x, y] is obtained by reading a parallax of the small area including the pixel at coordinates (x, y) from background parallax data obtained every small area.

The sum of absolute values of the brightness differences of the pixels at the corresponding positions in the small areas of the right and left images is obtained. When the sum is larger than a threshold value, the relevant small area is extracted. This process is performed to all small areas in the right image. The extracted small areas are output as a section list indicating an intruding object.

In the rematching every block, the brightnesses are compared using pixels whose number is larger than the number of pixels used in the rematching every pixel. Accordingly, the rematching every block is hardly influenced by noises. Objects can be detected with higher reliability.

As mentioned above, according to the first embodiment, the process of obtaining background parallaxes by stereo matching is executed for a preparatory period just after the start. Accordingly, an apparatus with a relatively low processing speed can perform this process. The general stereo matching process includes a searching step of finding a matching point between right and left images to determine a parallax. Generally, the searching step requires brightness comparison operations at least several tens of times per pixel or block. Therefore, the amount of operations for the whole image is enormous. According to the present embodiment, the above process is performed for the preparatory period just after the start. An apparatus with a relatively low processing speed can perform this process. In addition, a parallax is obtained by comparing the brightnesses once per pixel or block every period of motion pictures. Thus, a low-cost apparatus with low processing speed can be used. This means that among known stereo matching techniques of obtaining a parallax, a complicated technique with high operation loads can be used. The parallax accuracy can be further increased.

Furthermore, the parallaxes for everything including the background in the image are stored. When fixed objects on the ground, for example, three-dimensional objects such as a wall, a fence, and trees exist in the field of view, the parallaxes for those objects are stored as background parallaxes. Consequently, these objects are not recognized as intruding objects by mistake. The present apparatus has a wide applicability and high reliability.

According to the present embodiment, an intruding object is detected using the difference between the brightnesses of two images taken by the stereo camera. A change in environmental illumination such as a fluctuation of solar irradiation evenly appears in both the two cameras constituting the stereo camera. Thus, the changes taken by the two cameras completely cancel each other out. In a case where an intruding object is detected using a change in illumination in a monochrome image taken by a single camera, the detection is influenced by the change in illumination. As mentioned above, however, the present apparatus is not influenced by the change in environmental illumination such as the fluctuation of solar irradiation. Since false detection and poor detection caused by the above fluctuation are prevented, the reliability of the apparatus can be increased.

Figure 6:
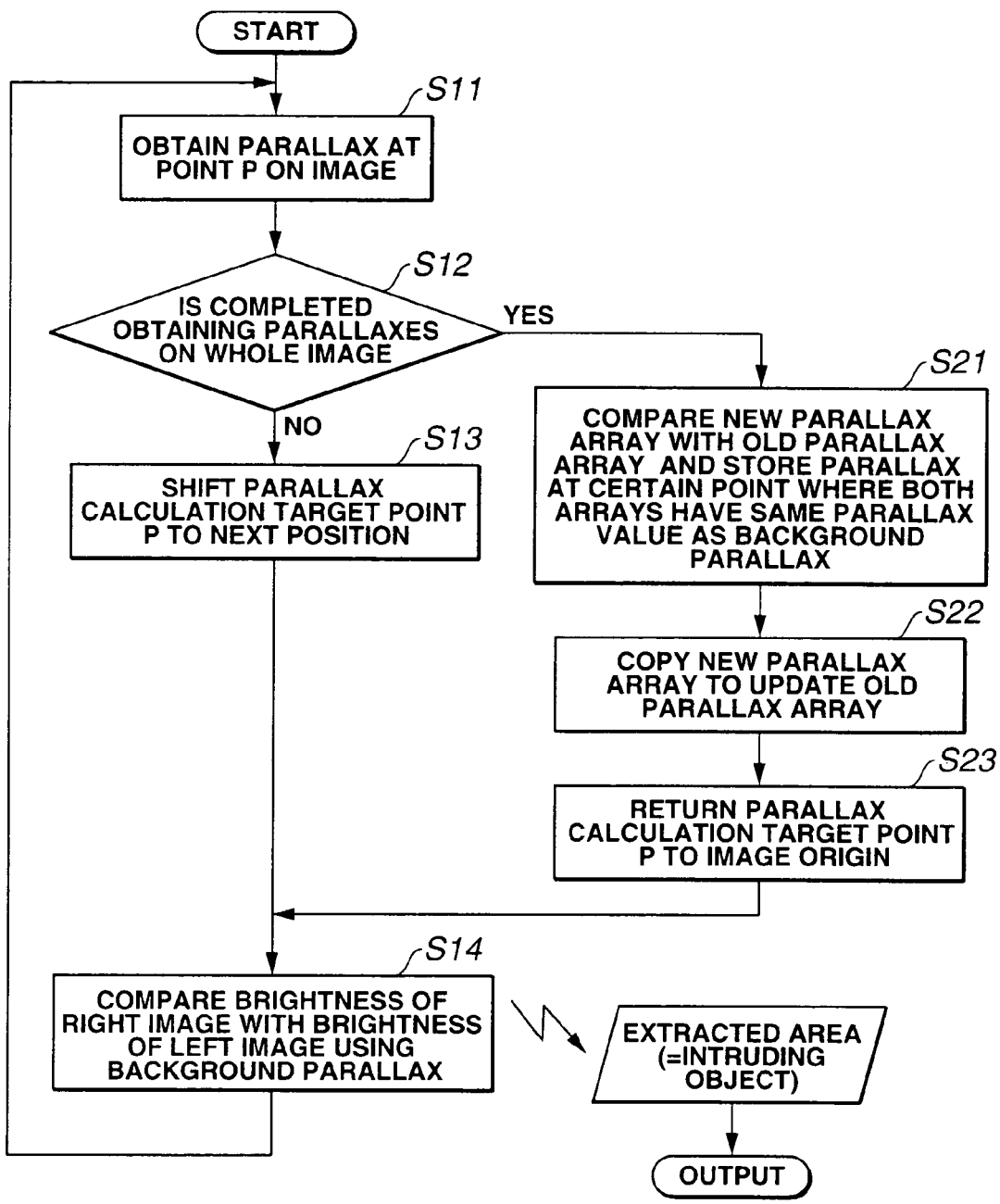
FIG. 6 is a flowchart of an intruding-object detection process according to a second embodiment of the present invention.
Figure 7:
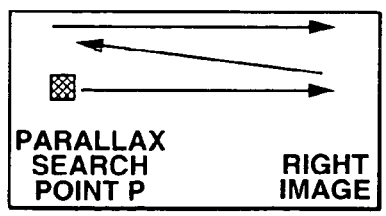
FIG. 7 is a diagram explaining a parallax search point according to the second embodiment.

A second embodiment of the present invention will now be described with reference to FIGS. 6 and 7. FIG. 6 is a flowchart of an intruding-object detection process according to the second embodiment. FIG. 7 is an explanatory diagram of a parallax search point according to the second embodiment.

According to the foregoing first embodiment, upon starting the apparatus, it is necessary to previously photograph the field of view including no intruding object. In other words, starting the apparatus depends on a state of an area to be monitored. Accordingly, a location where the intruding-object detection apparatus is set is slightly restricted. According to the second embodiment, a parallax for a fixed object is stored as a background by an automatic process which is being operated, thus eliminating the above restriction.

FIG. 6 is the flowchart of the intruding-object detection process according to the second embodiment. This process can be started at any time irrespective of whether an intruding object exists in the field of view of the stereo camera. The process is executed every period of motion pictures.

When this process is started, in step S11, the parallax calculation similar to the first embodiment is performed to a predetermined parallax calculation target point (parallax search point) P in the right image. The coordinates of the point P are shifted every frame in the order of raster scanning of the whole image. Just after the start, an initial position of the point P is the origin of the image. According to the second embodiment, the origin is initialized to the left lower corner of the image. The parallax calculated in step S11 is stored as array data for each coordinates of the point P in the memory. Parallax array data obtained by repeating step S11 is called a new parallax array.

The process proceeds to step S12. In step S12, whether scanning the whole image with respect to the coordinates of the point P has been completed in the raster scanning order to obtain the parallaxes in the whole image is determined. In other words, whether the present position of the point P denotes the right upper corner of the image is determined. If the point P does not reach the right upper corner of the image and the parallaxes in the whole image are not obtained, the process proceeds from step S12 to step S13. In step S13, the parallax search point P is shifted to the next position only by the minimum unit in the raster scanning order. In other words, as shown in FIG. 7, when the current position of the parallax search point P is not the right end of the image, the point P is shifted by one pixel to the right. In other cases, the point P is shifted to the left end on the next-upper line. Step S14 subsequent to step S13 is similar to step S2 of the intruding-object detection process according to the foregoing first embodiment. In step S14, the right and left images are rematched to extract an area corresponding to an intruding object.

After that, the position of the parallax search point P reaches the right upper corner of the image. In step S11, the parallax is calculated. When the parallaxes in the whole image are completely obtained, the process proceeds from step S12 to step S21. In step S21, the new parallax array formed in the memory by repeating step S11 is compared with an old parallax array of first previous frame (formed in the next step S22).

The old and new parallax arrays include parallax values of respective coordinates in the right image. At certain coordinates (x, y), when the parallax values of both the arrays are the same, this parallax value is stored as a background parallax at the point (x, y) into the memory, thus updating the background parallax at this position (x, y) stored in the previous frame. The process of obtaining the parallax of each parallax search point P is performed for all the coordinates in the image. Thus, the background parallaxes are formed in the same way as the first embodiment.

On the other hand, in the comparison between the old and new parallax arrays in step S21, if the parallax values are different from each other, data at the point (x, y), where the parallax values are different from each other, is not updated. When step S21 is first executed, the old parallax array is not formed yet. Accordingly, the comparison is not made between the old and new parallax arrays and the process proceeds to the next step S22.

In step S22, the new parallax array is copied in an area in the memory where the old parallax array is stored, thus updating old parallax array data. In step S23, the parallax search point P is shifted to the origin of the image, namely, the left lower corner. The process proceeds to step S14. After that, the next frame is processed.

In other words, the background parallaxes are repetitively formed and updated during the operation of the apparatus by the process in steps S11 to S13 and S21 to S23. According to the second embodiment, the parallax is calculated by one pixel per period of motion pictures. For example, it is assumed that one image comprises 512×200=102400 pixels and the rate of motion pictures is set to 30 frames per second and 102400/30≅3413 seconds≅a little less than one hour is set to one period. The background parallaxes are formed and updated for one period, which is obtained as mentioned above.

By the comparison between the old and new parallax arrays in step S21, the parallax value of a fixed object, namely, a background having the same parallax for a period of time longer than the above-mentioned one period is stored as a background parallax. An object having a changed parallax value, namely, a moving object is not stored as a background parallax. The above process is repeated every frame of the image, thus outputting a section list indicating an intruding object every frame.

According to the second embodiment, similar to the first embodiment, the influences of a three-dimensional object existing in the background and an environmental condition can be eliminated and an intruding object can be detected with high accuracy and high reliability. Furthermore, a parallax for a fixed object is stored as a background by the automatic process which is being operated. Accordingly, it is not necessary to allow the stereo camera to recognize the field of view including no intruding object upon starting. Thus, the apparatus can be easily installed and started. The apparatus according to the second embodiment is more advantageous when a monitor area is set to a railroad crossing where it is difficult to stop train operations.

As mentioned above, according to the present invention, a matching point for the same subject between a reference image and a comparison image is obtained and stored, the reference image and the comparison image being taken by a stereo camera, the difference between image information near an arbitrary position in the reference image and image information near a position, deviated from the arbitrary position by the stored matching point, in the comparison image is evaluated, and an area where the difference is large is output as an area indicating an intruding object. Therefore, the influences of a three-dimensional object existing in the background and an environmental condition can be eliminated. An intruding object can be detected with high accuracy and high reliability.

It will be obviously understood that many modifications and variations are possible within the spirit and scope of the appended claims of the present invention. The scope of the present invention is defined by the scope of the appended claims, and is not limited at all by the specific descriptions of this specification.

What is claimed is:

1. An intruding-object detection apparatus for detecting an object intruding into a field of view as an intruding object using a pair of images taken by a stereo camera, the pair of images being a reference image and a comparison image, the apparatus comprising:

means for obtaining a matching point for the same object between the reference image and the comparison image and, for storing the obtained matching point; and means for evaluating the difference between image information near an arbitrary position in the reference image and image information near a position, deviated from the arbitrary position by the stored matching point, in the comparison image and for outputting an area, where the difference is large, as an area indicating an intruding object.

2. The apparatus according to claim 1, wherein the matching point is a parallax for the same subject between the reference image and the comparison image.

3. The apparatus according to claim 1, wherein the matching point is obtained for every pixel.

4. The apparatus according to claim 1, wherein the matching point is obtained for every block which has a predetermined size and a predetermined shape in the image.

5. The apparatus according to claim 1, wherein the difference between the image information includes the absolute value of the difference between the brightnesses of the images.

6. The apparatus according to claim 1, wherein the difference between the image information is evaluated for every pixel.

7. The apparatus according to claim 1, wherein the difference between the image information is evaluated for every block which has a predetermined size and a predetermined shape in the image.

8. The apparatus according to claim 1, wherein a process of storing the matching point is executed to the whole image only once before an intruding-object detection process.

9. The apparatus according to claim 1, wherein a process of storing the matching point is sequentially executed to a part of the image simultaneously with an intruding-object detection process to update stored data regarding the matching point at any time.

* * * * *